US008745470B2

(12) United States Patent
Haustein et al.

(10) Patent No.: US 8,745,470 B2
(45) Date of Patent: *Jun. 3, 2014

(54) METHOD AND SYSTEM FOR DATA TRANSMISSION IN A DATA NETWORK

(71) Applicant: Nokia Siemens Networks Oy, Espoo (FI)

(72) Inventors: Thomas Haustein, Potsdam (DE); Robert Inderst, Pöcking (DE); Jijun Luo, Munich (DE); Fred Matthiesen, München (DE); Kay Migge, München (DE); Sebastian Weiser, München (DE)

(73) Assignee: Nokia Siemens Networks Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/928,965

(22) Filed: Jun. 27, 2013

(65) Prior Publication Data

US 2013/0290804 A1    Oct. 31, 2013

Related U.S. Application Data

(63) Continuation of application No. 12/744,790, filed as application No. PCT/EP2008/066067 on Nov. 24, 2008, now Pat. No. 8,495,474.

(30) Foreign Application Priority Data

Nov. 30, 2007    (EP) .................... 07023291

(51) Int. Cl.
*G06F 11/00* (2006.01)
(52) U.S. Cl.
USPC ........................................ 714/776
(58) Field of Classification Search
USPC .......................................... 714/776
See application file for complete search history.

(56) References Cited

U.S. PATENT DOCUMENTS

| 2007/0206497 A1 | 9/2007 | Plamondon et al. | 370/231 |
| 2008/0198814 A1 | 8/2008 | Wengerter et al. | 370/336 |
| 2008/0273454 A1 | 11/2008 | Malkamaki et al. | 370/216 |

FOREIGN PATENT DOCUMENTS

| EP | 1 179 910 A2 | 2/2002 |
| WO | WO 00/52873 | 9/2000 |
| WO | WO 01/37452 A1 | 5/2001 |
| WO | WO 2006/101347 A1 | 9/2006 |

OTHER PUBLICATIONS

Annamalai A., et al., "Analysis and Optimization of Adaptive Multicopy Transmission ARQ Protocols for Time-Varying Channels", © 1998 IEEE, Oct. 1998, pp. 1356-1368.
Garcia, L.G.U., et al., "Autonomous Component Carrier Selection for Local Area Uncoordinated Deployment of LTE-Advanced", © 2009 IEEE, 5 pgs.

*Primary Examiner* — Bryce Bonzo
(74) *Attorney, Agent, or Firm* — Harrington & Smith

(57) ABSTRACT

The present invention relates to a method and system for data transmission in a data network. According to the method, a data packet is sent from a sender to a receiver. If a data packet is incorrectly received on the receiver, a repeat request is sent from the receiver to the sender. Upon receiving the repeat request on the sender, the data packet is resent from the sender to the receiver. After having received on the sender a predetermined number of repeat requests requesting the reseeding of the same data packet, a predetermined quantity of copies of the data packet is sent from the sender to the receiver, wherein the predetermined quantity includes at least two copies, or a predetermined quantity of additional information packets is sent from the sender to the receiver.

19 Claims, 3 Drawing Sheets

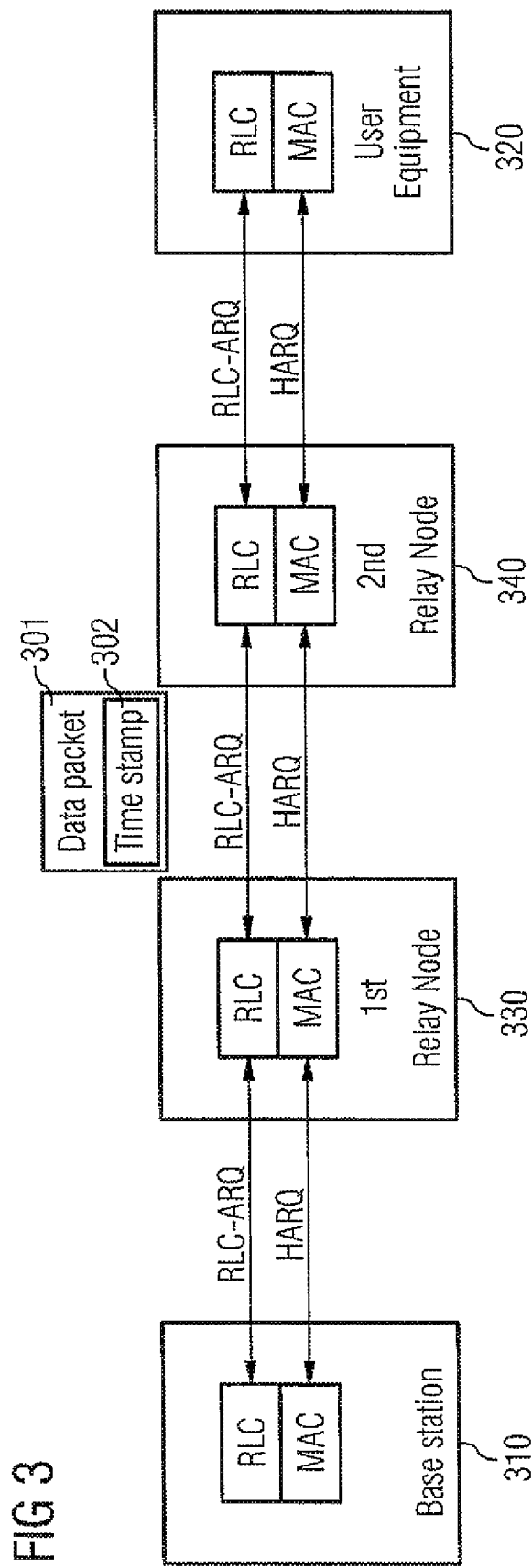

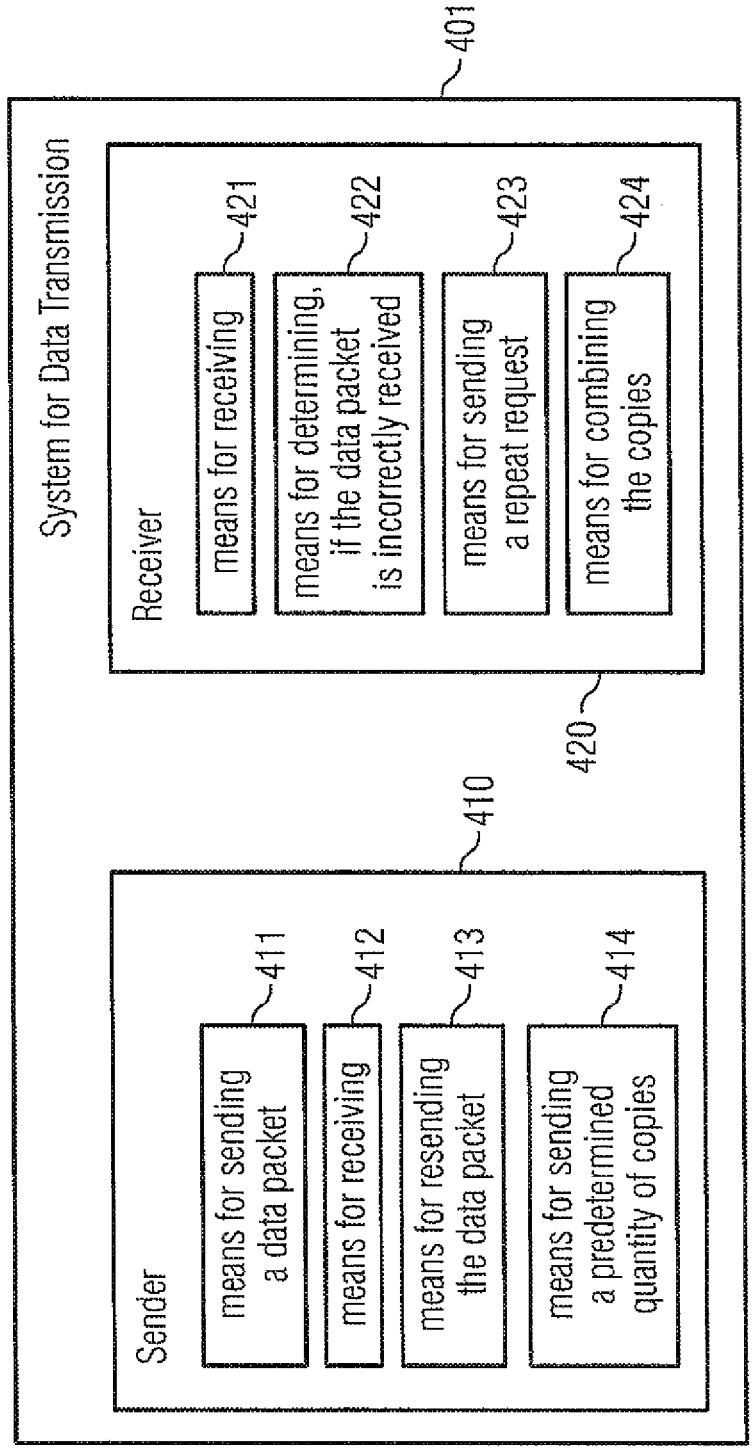

METHOD AND SYSTEM FOR DATA TRANSMISSION IN A DATA NETWORK

CROSS-REFERENCE TO RELATED APPLICATIONS

This application is a continuation of U.S. patent application Ser. No. 12/744,790, which is the National Stage of International Application No. PCT/EP2008/066067, filed Nov. 24, 2008.

The present invention relates to a method and system for data transmission in a data network.

In data networks, channel noise and co-channel interference can cause transmission errors which have to be taken care of. Especially in the case of multi-user applications, these transmission errors cause a higher Packet Error Rate (PER) and consequently a larger packet delay, because packets have to be retransmitted. This also leads to a degradation of the packet throughput in the data network. Therefore, a major concern in multi-user applications is to reduce transmission errors and delays in the data network and help to maintain the Quality of Service (QoS) parameters for a specific user.

From the prior art, Automatic Repeat Request (ARQ) processes are known. A pure automatic repeat request process detects transmission failures on the Medium Access Control (MAC) layer by using a Cyclic Redundancy Check (CRC). The receiver discards erroneous packets and sends a request for retransmission to the sender if the cyclic redundancy check fails.

Furthermore, Hybrid Automatic Repeat Request (H-ARQ) processes are known from the prior art. H-ARQ processes are an adaptive data transmission technique to reduce the delay due to erroneous or lost packets and thus may improve the system throughput significantly. The aim of H-ARQ is to provide a simple mechanism combining a Forward Error Correction (FEC), exploiting coding gain, and the basic ARQ mechanism in order to comply with the QoS constraints.

The QoS constraints that are in general to be fulfilled, are delay, jitter, throughput maximization, and reliability of data transmission, which is e.g. important for voice over IP or video conferencing applications.

In addition, from the prior art it is known to not discard erroneous packets, but to combine them with packets that have been received after the request of a retransmission. In this connection, there are mainly two popular combining methods, namely Chase Combining (CC) and Incremental Redundancy (IR). In the case of Chase Combining, the receiver combines erroneous subsequently transmitted packets to reduce the code rate, which is similar to repetition coding. The receiver can exploit the specific coding gain as illustrated by FIG. 1. In FIG. 1, 101 denotes the first transmission, 102 the first retransmission, and 103 the second retransmission. The coding gain that is reached by the first retransmission is illustrated by 111, and the coding gain that is reached by the second retransmission is illustrated by 112. As can be seen from FIG. 1, with each retransmission, the code rate is reduced and the signal-to-noise ratio is improved. However, the amount of the improvement reduces with each retransmission.

In the case of Incremental Redundancy, the sender transmits systematic bits first and proceeds with redundant (parity) bits for further retransmissions, if needed, and thus improves decoding of the packet.

Usually, ARQ is implemented on the MAC layer of a data network. To further reduce the delay in the system between the MAC and the physical layer, the idea of H-ARQ is to place an ARQ mechanism as close as possible to the physical layer of the system, which allows for faster retransmissions. A communication system can have both, ARQ and H-ARQ mechanisms, enabled to improve data transmission.

According to an H-ARQ process using Chase Combining the erroneous data packets are retransmitted and combined at the receiver to reduce the code rate until a decoding is possible having a specific signal-to-noise ratio. As indicated in FIG. 1, the signal-to-noise ratio gain reduces for consecutive retransmissions. Furthermore, the combining is done using the received symbols or alternatively using soft bit combining after the demodulator, which allows for independent Modulation and Coding Schemes (MOS) and therefore different resource mapping for the original and the multiple copies received in retransmission attempts. In prior art H-ARQ implementations, the H-ARQ retransmission uses the same Modulation and Coding Scheme (MCS) and spatial mode (diversity or multiplexing transmission) for its retransmissions.

It is a problem of the Automatic Repeat Request techniques that the delay increases due to the retransmissions.

Especially in scenarios where a low Packet Error Rate needs to be accomplished over a wireless connection, while providing low delays, the Automatic Repeat Request technique possesses problems. Examples are e.g. real time applications like voice over IP or video phone calls in a UMTS network. Therefore, in UMTS Long Term Evolution (LTE), a maximum of 3 retransmissions are considered.

In UMTS networks in general, a scheduler grants resources for users or data connections based on an optimized working point for the H-ARQ process in order to boost throughput with acceptable packet outage after the maximum retransmission number. This means that the working point is chosen such that the Packet Error Rate after the third retransmission is acceptable for the application using the connection. For example, FTP file download from a full buffer easily can handle a final Packet Error Rate of $10^{-3}$, since the higher layers will handle the remaining errors and the overall transmission delay of a single packet is insignificant. Therefore, for this kind of application, the working point would be set at a Packet Error Rate of around 10%. This would mean for the first transmission a Packet Error Rate of 10%, for the second transmission a PER of 1% and for the third transmission a PER of $10^{-3}$.

However, for a real time video decoder, the input Packet Error Rate must be $10^{-6}$ or below. In order to satisfy this criterion with just three transmission attempts, it would be necessary to set the initial working point at a Packet Error Rate of 1%, instead of 10%, which would cause a tremendous drop in throughput.

It is an object of the present invention to provide a method and a system for data transmission in a data network that allows for an acceptable final. Packet Error Rate and an acceptable transmission delay at the same time.

According to the invention, this object is accomplished by a method and a system according to the independent claims. Preferred embodiments are specified by the dependent claims.

The invention comprises a method for data transmission in a data network. The method may comprise the steps of sending a data packet from a sender to a receiver, if the data packet is incorrectly received on the receiver, sending a repeat request from the receiver to the sender, upon receiving the repeat request on the sender, resending the data packet from the sender to the receiver, and after having received on the sender a predetermined number of repeat requests requesting the resending of the data packet, sending a predetermined quantity of copies of the data packet from the sender to the receiver, wherein the predetermined quantity comprises at least two copies, or sending a predetermined quantity of additional information packets from the sender to the receiver.

This means that after a predetermined number of repeat requests that indicate a failure of a packet transmission for the same packet, the sender may send the packet to be retransmitted several times one after the other in order to exploit the repetition coding gain e.g. by using a chase combiner on the receiver. The n-th fold retransmission in the k-th attempt hardly affects the overall throughput, but allows to reduce the final packet error probability and therefore the packet loss to very low values without compromising the total delay determined by the maximum number of retransmission attempts. In an embodiment, additional information may be sent from the sender to the receiver, which is especially advantageous if incremental redundancy is used.

In a preferred embodiment, the method according to the invention comprises the step of combining the data packet and the copies of the data packet on the receiver using a combiner and/or combining the data packet with the predetermined quantity of additional information packets on the receiver using a combiner.

This allows to use chase combining and/or incremental redundancy.

Preferably, each of the copies of the data packet comprises a retransmission number and a process identifier. In this way, it is possible to determine at the receiver that the multiple copies each contain the same data packet.

In a preferred embodiment, the method comprises the steps of determining the predetermined number and/or the predetermined quantity based on a resource utilization degree.

For example, in case of a requested retransmission, the scheduler may encounter unused resources in the MAC layer, before the deadline of the traffic discarding. Then, already in the second retransmission or even in the first retransmission, the predetermined quantity of copies of the data packet may be sent from the sender to the receiver. Such joint interworking between the scheduler and the MAC H-ARQ will enhance the usage of resources and transmission reliability with a significant reduction of delay outage probabilities. This mechanism is especially suitable for the downlink, since in the downlink, this does not cost extra-capacity and the downlink is in general not power-limited.

Especially in a multi-hop scenario, the method preferably comprises the steps of providing a maximally acceptable transmission time for transmitting the data packet from an initial source of the data packet to an eventual destination of the data packet, determining a number of communication nodes that relay the data packet from the initial source of the data packet to the eventual destination of the data packet, wherein each node is able to adopt the role of a receiver and the role of a sender, inserting on the initial source a time stamp into the data packet, wherein the time stamp indicates a time at which the initial source of the data packet sent the data packet, transmitting the data packet from the initial source to the eventual destination by relaying the data packet from node to node, and, for each pair of nodes, determining the predetermined number and/or the predetermined quantity based on the time stamp, the current time, and the maximally acceptable transmission time.

In this way, it is possible to optimize for each hop from node to node the predetermined number and/or the predetermined quantity based on the remaining time for the transmission. For example, the method may decide to already send the predetermined quantity of copies of a data packet with a first retransmission, when the remaining transmission time is already low, which means that the method is able to dynamically trade off resource utilization against delay improvement.

Preferably, the method according to the invention comprises the step of determining the predetermined number and/or the predetermined quantity based on a property of the receiver.

For example, different user equipments may have different capabilities. Normally, the buffering and processing capabilities limit the number of retransmitted packets. In this situation, the associated reverse control channel of the H-ARQ process may indicate the maximum number of retransmitted protocol data units that can be processed by the user equipment simultaneously.

The information exchange may be also performed in the beginning with a call setup, e.g. through the knowledge of the terminal class mark. Also, the dynamic capabilities, such as the battery status, may be taken into account by the dynamic control signalling which is preferably carried by the associated reverse control channel.

The duplicated retransmitted packets should not be transmitted via the forward link more than agreed by the user equipment. The number of the duplication may be implicit through a chain pointer or may be explicitly indicated to the user equipment for combining purposes.

The receiver may not need to decode all the retransmitted packets after a correct cyclic redundancy check. The not decoded MAC protocol data units under the same process identifier may be discarded in order to save battery.

If the user equipment indicates the proposed enhanced H-ARQ capability class, the scheduler may autonomously change the working point for the initial Packet Error Rate such that the first Packet Error Rate is higher and a higher throughput can be achieved. The enhanced H-ARQ capability may assure that the final outage probability is still adjusted to the requested QoS of the application.

The invention further comprises a system for data transmission in a data network. The system may comprise means for sending a data packet from a sender to a receiver, means for sending a repeat request from the receiver to the sender, if the data packet is incorrectly received on the receiver, means for resending the data packet from the sender to the receiver, upon receiving the repeat request on the sender, and means for sending a predetermined quantity of copies of the data packet from the sender to the receiver, after having received on the sender a predetermined number of repeat requests requesting the resending of the data packet, wherein the predetermined quantity comprises at least two copies, or means for sending a predetermined quantity of additional information packets from the sender to the receiver, after having received on the sender a predetermined number of repeat requests requesting the resending of the data packet.

The system has substantially the same advantages as the method according to the invention.

Preferably, the system comprises means for combining the data packet and the copies of the data packet on the receiver and/or means for combining the data packet with the predetermined quantity of additional information packets on the receiver.

Each of said copies of the data packet may comprise a retransmission number and a process identifier.

Preferably, the system further comprises means for determining the predetermined number and/or the predetermined quantity based on a resource utilization degree.

In a preferred embodiment, the system comprises means for providing a maximally acceptable transmission time for transmitting the data packet from an initial source of the data packet to an eventual destination of the data packet, means for determining a number of communication nodes that relay the data packet from the initial source of the data packet to the eventual destination of the data packet, wherein each node is able to adopt the role of a receiver and the role of a sender, means for inserting on the initial source a time stamp into the data packet, wherein the time stamp indicates a time at which the initial source of the data packet sent the data packet, means for transmitting the data packet from the initial source to the eventual destination by relaying the data packet from node to node, and means for determining for each pair of nodes the predetermined number and/or the predetermined quantity based on the time stamp, the current time, and the maximally acceptable transmission time.

Preferably, the system comprises means for determining the predetermined number and/or the predetermined quantity based on a property of the receiver.

The method as well as the system may be implemented using software. Therefore, the invention further comprises a computer program product, the computer program product comprising a computer readable medium and a computer program recorded therein in form of a series of state elements corresponding to instructions which are adapted to be processed by a data processing means of a data processing apparatus such that the method according to the invention is performed or the system according to the invention is formed on the data processing means.

The invention may have the advantage that the overall throughput is increased in comparison to the prior art, because the working point for the first transmission can be set such that a high packet error probability is allowed. The invention may further have the advantage that it is very fast and has a very low extra-delay. The several retransmission protocol data units may be mapped to different resources (diversity in case of interference and channel mismatch). It may be possible to control the final packet error probability using the last repetition coding gain. Furthermore, the invention may have the advantage that it needs little extra capacity that does not necessarily degrade the overall system performance. The invention may be implemented such that it is performed almost invisible for the physical layer. The invention may be combined with Chase Combining and Incremental Redundancy. It may be easily implemented and possibly does not compromise the total delay. It may provide more scalability of QoS level control thanks to the concurrent parameter setting of the transmissions.

Preferred embodiments and further details of the present invention will be explained in the following with reference to the figures.

FIG. 3 illustrates another embodiment of the method according to the present invention.

FIG. 4 shows one embodiment of the system according to the present invention.

Figure 1:
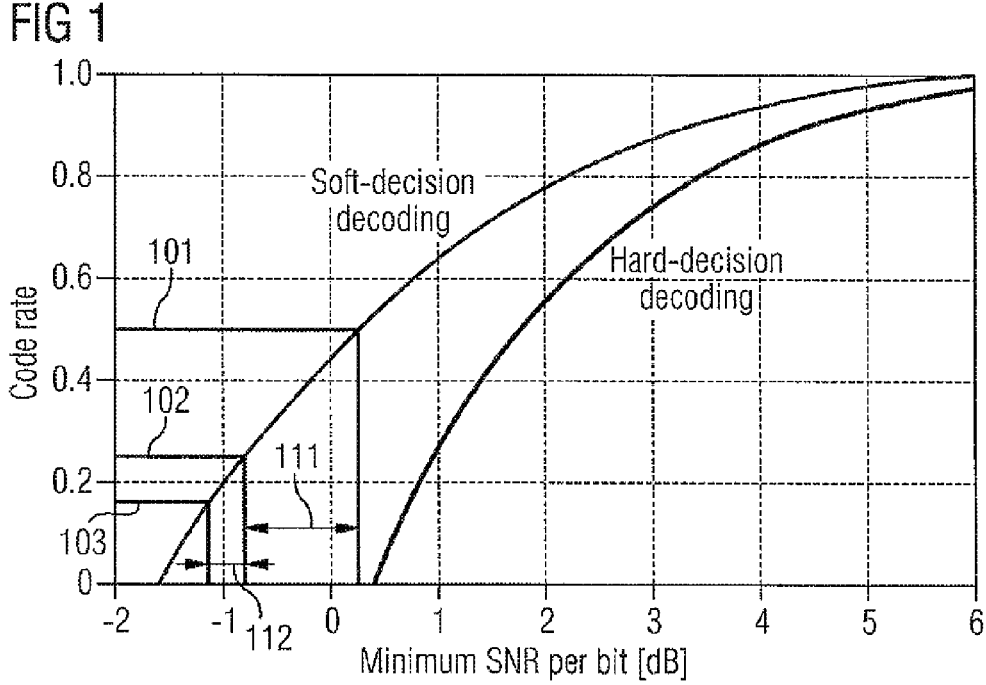
FIG. 1 shows a code rate as a function of the minimum signal-to-noise ratio per bit for soft and hard decision decoding.
Figure 2:
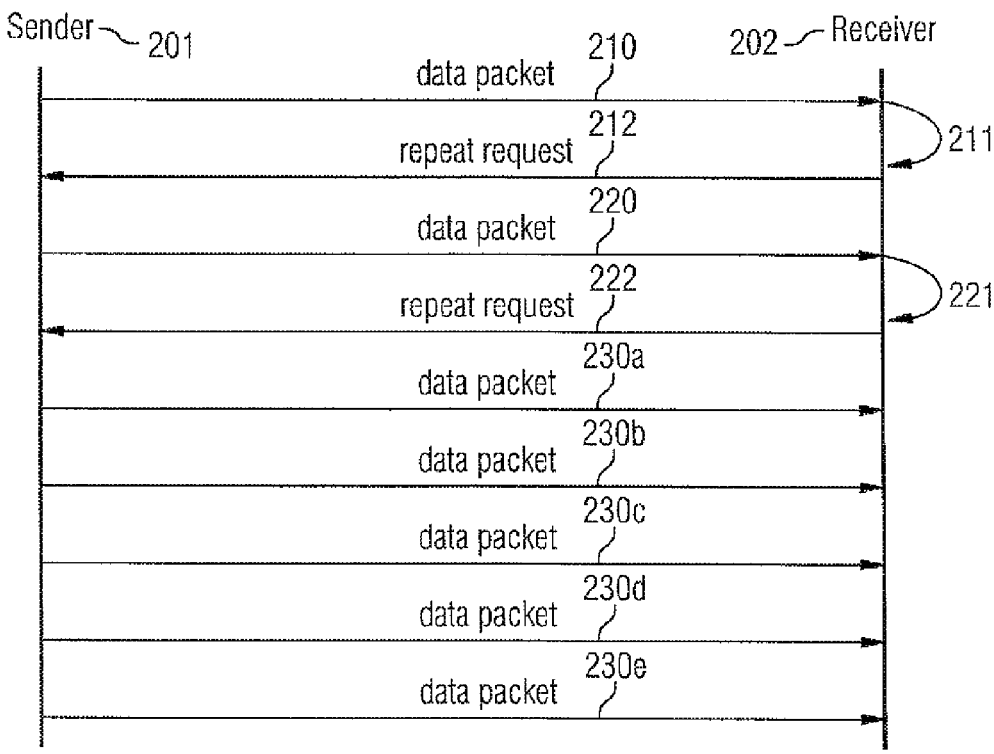
FIG. 2 shows one embodiment of the method according to the present invention.

FIG. 2 shows one embodiment of the method according to the present invention. In step 210, a sender 201 sends a data packet to the receiver 202. In step 211, the receiver 202 determines that the data packet has been incorrectly received. Therefore, the receiver 202 sends a repeat request to the sender 201 in step 212.

After having received the repeat request, the sender 201 sends the data packet again to the receiver 202 in step 220. In the described scenario, once again the data packet is incorrectly received, which is determined in step 221.

Therefore, the receiver 202 once again sends a repeat request to the sender 201 in step 222.

Since the sender 201 has now already received twice a repeat request for the same data packet, it sends this data packet five times to the receiver 202 in the steps 230a-230e.

FIG. 3 illustrates another embodiment of the method according to the present invention that is optimized for a multi-hop scenario. In the scenario shown in FIG. 3, a data packet 301 is to be transmitted from a base station 310 to a user equipment 320. In order to enable a control of the overall transmission process, the base station 310 inserts a time stamp 302 into the data packet 301. Furthermore, the data packet 301 may contain a maximally acceptable transmission time for transmitting the data packet from the base station 310 to the user equipment 320. Alternatively, this maximally acceptable transmission time may be well-known in the system.

For the transmission from the base station 310 to the user equipment 320, a first relay node 330 and a second relay node 340 are determined.

Each of the nodes 310, 320, 330, 340 comprises a Medium Access Control (MAC) and a Radio Link Control (RLC). Using the MAC and the RLC, the data packet 301 is transmitted from the base station 310 to the user equipment 320 via the relay nodes 330 and 340. Based on the time stamp 302, the current time, and the maximally acceptable transmission time, it is determined for each pair of nodes how many repeat requests are to be sent, before the sender sends multiple copies of the data packet from the sender to the receiver. Also the number of the copies may depend on the time stamp, the current time, and the maximally acceptable transmission time.

In this way, it becomes possible that in the case that only little time is left before the maximally acceptable transmission time is reached, multiple copies of the data packet are sent early, e.g. already with the first retransmission, to ensure a fast transmission of the data packet to the user equipment 320.

FIG. 4 illustrates one embodiment of a system for data transmission 401 according to the present invention. The system for data transmission 401 comprises a sender 410 and a receiver 420. The sender 410 comprises means, for sending a data packet 411, means for receiving 412, means for resending the data packet 413, and means for sending a predetermined quantity of copies of the data packet 414.

The receiver 420 comprises means for receiving 421, means for determining, if the data packet is incorrectly received 422, means for sending a repeat request 423, and means for combining the copies of the data packet 424.

The means for sending a data packet 411 sends a packet to the means for receiving 421. The means for determining if the data packet is incorrectly received 422 determines that the data packet is incorrectly received and informs the means for sending a repeat request 423, which then sends a repeat request to the means for receiving 412. Upon receipt of the repeat request, the means for resending the data packet 413 resends the data packet.

If a repeat request for the same data packet has been received a predetermined number of times on the sender 410, the means for sending a predetermined quantity of copies 414 sends a plurality of copies to the receiver 420, having a means for combining the copies 424 that combines the received copies of the data packet.

The specifications and drawings are to be regarded in an illustrative rather than a restrictive sense. It is evident that various modifications and changes may be made thereto, without departing from the scope of the invention as set forth in the claims. It is possible to combine the features described in the embodiments in a modified way for providing additional embodiments that are optimized for a certain usage scenario. As far as such modifications are readily apparent for a person skilled in the art, these modifications shall be regarded as implicitly disclosed by the above described embodiments.

The invention claimed is:

1. An apparatus comprising:
one or more processors; and
one or more memories including computer program code, the one or more memories and the computer program code configured, with the one or more processors, to cause the apparatus to perform:
sending a data packet;
receiving a repeat request requesting the resending of the data packet, if the data packet was incorrectly received;
resending the data packet; and
after having received a predetermined number of repeat requests requesting the resending of the data packet, sending a predetermined quantity of duplicate copies of the data packet, wherein the predetermined quantity comprises at least two duplicate copies, or sending a predetermined quantity of additional information packets, and wherein the predetermined quantity of duplicate copies of the data packet is determined based on an indication of a maximum number of retransmitted data units that can be processed simultaneously.

2. The apparatus as claimed in claim 1, wherein each of said duplicate copies of the data packet comprises a retransmission number and a process identifier.

3. The apparatus as claimed in claim 1, wherein the predetermined number and/or the predetermined quantity is/are determined based on a resource utilization degree.

4. The apparatus as claimed in claim 1, wherein the one or more memories and the computer program code are further configured, with the one or more processors, to cause the apparatus to perform:
providing a maximally acceptable transmission time for transmitting the data packet to an eventual destination;
determining a number of communication nodes that relay the data packet to the eventual destination, wherein each node is able to adopt the role of a receiver and the role of a sender;
inserting a time stamp into the data packet, wherein the time stamp indicates a time at which the data packet was sent;
transmitting the data packet to the eventual destination by relaying the data packet from node to node; and
determining the predetermined number of repeat requests and/or the predetermined quantity of duplicate copies of the data packet based on the time stamp, the current time, and the maximally acceptable transmission time.

5. The apparatus as claimed in claim 1, wherein the apparatus is a mobile terminal or user equipment.

6. The apparatus as claimed in claim 1, wherein the apparatus is a network element.

7. An apparatus comprising:
one or more processors; and
one or more memories including computer program code, the one or more memories and the computer program code configured, with the one or more processors, to cause the apparatus to perform:
receiving a data packet;
determining whether the data packet has been correctly received;
sending a repeat request, if the data packet has not been correctly received; and
after sending a predetermined number of repeat requests, receiving a predetermined quantity of duplicate copies of the data packet, wherein the predetermined quantity comprises at least two duplicate copies, or sending a predetermined quantity of additional information packets, wherein the predetermined quantity of duplicate copies of the data packet is determined based on an indication of a maximum number of retransmitted data units that can be processed simultaneously.

8. The apparatus as claimed in claim 7, wherein the one or more memories and the computer program code are further configured, with the one or more processors, to cause the apparatus to perform:
combining the data packet and the duplicate copies of the data packet using a combiner or combining the data packet with the predetermined quantity of additional information packets using a combiner.

9. The apparatus as claimed in claim 7, wherein each of said duplicate copies of the data packet comprises a retransmission number and a process identifier.

10. The apparatus as claimed in claim 7, wherein the predetermined number and/or the predetermined quantity is/are determined based on a resource utilization degree.

11. The apparatus as claimed in claim 7, wherein the apparatus is a mobile terminal or user equipment.

12. The apparatus as claimed in claim 7, wherein the apparatus is a network element.

13. An apparatus comprising:
one or more processors; and
one or more memories including computer program code, the one or more memories and the computer program code configured, with the one or more processors, to cause the apparatus to perform:
sending a data packet;
receiving a data packet;
receiving a repeat request requesting the resending of a sent data packet, if the data packet was incorrectly received by another apparatus;
determining whether a received data packet has been correctly received;
resending the sent data packet;
sending a repeat request, if the received data packet has not been correctly received;
after having received a predetermined number of repeat requests requesting the resending of the sent data packet, sending a predetermined quantity of duplicate copies of the sent data packet, wherein the predetermined quantity comprises at least two duplicate copies, or sending a predetermined quantity of additional information packets; and
after sending a predetermined number of repeat requests, receiving a predetermined quantity of duplicate copies of the received data packet, wherein the predetermined quantity comprises at least two duplicate copies, or sending a predetermined quantity of additional information packets, wherein the predetermined quantity of duplicate copies of the received data packet is determined based on an indication of a maximum number of retransmitted data units that can be processed simultaneously.

14. The apparatus as claimed in claim 13, wherein the one or more memories and the computer program code are further configured, with the one or more processors, to cause the apparatus to perform:

combining the received data packet and the duplicate copies of the received data packet using a combiner or combining the received data packet with the predetermined quantity of additional information packets using a combiner.

15. The apparatus as claimed in claim 13, wherein each of said duplicate copies of the data packet comprises a retransmission number and a process identifier.

16. The apparatus as claimed in claim 13, wherein the predetermined number and/or the predetermined quantity is/are determined based on a resource utilization degree.

17. The apparatus as claimed in claim 13, wherein the one or more memories and the computer program code are further configured, with the one or more processors, to cause the apparatus to perform:

providing a maximally acceptable transmission time for transmitting the sent data packet to an eventual destination;

determining a number of communication nodes that relay the sent data packet to the eventual destination, wherein each node is able to adopt the role of a receiver and the role of a sender;

inserting a time stamp into the sent data packet, wherein the time stamp indicates a time at which the sent data packet was sent;

transmitting the sent data packet to the eventual destination by relaying the sent data packet from node to node; and determining the predetermined number of repeat requests and/or the predetermined quantity of duplicate copies of the sent data packet based on the time stamp, the current time, and the maximally acceptable transmission time.

18. The apparatus as claimed in claim 13, wherein the apparatus is a mobile terminal or user equipment.

19. The apparatus as claimed in claim 13, wherein the apparatus is a network element.

* * * * *